United States Patent [19]

Bauer

[11] Patent Number: 5,342,088
[45] Date of Patent: Aug. 30, 1994

[54] DEPLOYMENT DOOR PATTERNS FOR AN AIR BAG SAFETY SYSTEM

[75] Inventor: David J. Bauer, West Bloomfield, Mich.

[73] Assignee: Tip Engineering Group, Farmington Hills, Mich.

[21] Appl. No.: 132,298

[22] Filed: Oct. 5, 1993

[51] Int. Cl.⁵ .............................. B60R 21/16
[52] U.S. Cl. .................. 280/728 B; 280/732
[58] Field of Search ............ 280/728 A, 728 B, 732, 280/743 R

[56] References Cited

U.S. PATENT DOCUMENTS

| | | | |
|---|---|---|---|
| 3,853,334 | 12/1974 | Auman et al. | 280/728 B |
| 4,148,503 | 4/1979 | Shiratori et al. | 280/728 B |
| 5,013,064 | 5/1991 | Miller et al. | 280/728 B |
| 5,154,444 | 10/1992 | Nelson | 280/728 B |

*Primary Examiner*—Kenneth R. Rice
*Attorney, Agent, or Firm*—John R. Benefiel

[57] ABSTRACT

A passenger side air bag deployment opening is formed by interfit unequal triangular door substrate panels, four triangular door substrate panels in a first embodiment fit into an asymmetric quadrangular deployment opening in the instrument panel and able to be hinged open by the inflating air bag. Three triangular door substrate panels in a second embodiment forming a triangular deployment opening the door patterns of each embodiment allow the door substrate panels to avoid damage to the windshield and injury to a passenger when forced open.

11 Claims, 7 Drawing Sheets

FIG-4

DEPLOYMENT DOOR PATTERNS FOR AN AIR BAG SAFETY SYSTEM

BACKGROUND OF THE INVENTION

This invention concerns air bag safety systems and more particularly, air bag installations utilizing one or more deployment door panels fit into an opening formed in an interior trim piece of an automobile passenger compartment. The door panels when hinged open enable the air bag to be deployed into the passenger compartment upon inflation from a storage container located behind the interior trim piece.

Air bag safety systems comprise one or more air bags each of which stored in a folded condition within an air bag canister. These systems include means for rapidly inflating the air bag upon sensing the beginning of a relatively severe collision. The inflated air bag is intended to cushion the driver or passenger to prevent injury as the vehicle is rapidly decelerated as a result of the collision.

Currently, a driver's side air bag is stored in a location within the steering wheel, while the front passengers are intended to be protected by an air bag stowed behind the instrument panel. Additional air bag locations are currently under consideration.

The present invention concerns particular problems associated with the front passenger air bag installations. Since the stored air bag is stored behind a trim piece, i.e., the instrument panel, an opening must be formed in the trim piece in order to allow the air bag to exit from its storage location and into the passenger compartment upon inflation.

This is done by opening of the hinged door panels described above which swing open as the air bag is inflated, typically by the air bag itself pushing the door panels out of the way. The construction of the deployment doors is important inasmuch as they should provide secure protection against tampering and yet allow instantaneous opening upon the occurrence of a crash event.

Since the door panels are fit within the trim structure in a highly visible location, i.e., in the steering wheel cover or the instrument panel, in the case of the driver's side and the passenger's side air bags respectively, styling is important. Such considerations have led to the so-called invisible seam type installation, in which the deployment door panels are covered with a smooth expanse of the trim piece outer layer and cannot be detected visually.

Various door patterns have been employed including, in the case of a double door, an "H" pattern in which two doors are hinged respectively at the top and bottom region of the trim piece and hinged along horizontal axes.

An X pattern has also been proposed in which four triangularly shaped and intefit deployment door panels are each hinged about base of the triangular shape. Experience with air bag safety systems has led to problems caused by impacting of the deployment door panels with either an occupant of the vehicle or with other portions of the vehicle interior, particularly the windshield.

Such impacts have caused injury and/or excessive damage to the vehicle. In particular, shattering of the windshield can also cause injury to an occupant by the scattering of glass fragments within the passenger compartment.

SUMMARY OF THE INVENTION

The present invention comprises patterns for the deployment door openings which minimize the possibilities of impacting of either the windshield or an occupant when the air bag is deployed.

In a first embodiment, the door pattern is asymmetrical, formed by four triangular door panels hinged along a base side and, prior to deployment, interfitted with each other to form a quadrangular opening within the instrument panel. The size of the quadrangle is defined by each of the hinged base sides of the four door flap door substrate panels.

The unhinged sides of the triangular door substrate panels together form a general "X" pattern within the surface of the instrument panel. In the configuration, according to the present invention, the quadrangle is so formed as to have unequal sides such as to skew the side edges of the quadrangle with respect to the side to side axis of the instrument panel.

The skewing of the right-hand side thus skews the hinge axis of the rightmost triangular door panel section and this skewing is in a direction which causes that door panel to swing substantially rearwardly as well as outwardly to avoid contact with the windshield.

The unequal size of the quadrangle also create a smaller lower or rear door panel section which has a peak skewed towards the center of the vehicle reducing the area of the upper rear surface of the instrument panel which is overlain by the rear door panel section when fully opened, to minimize the possibility of contact with the hand of an occupant inadvertently placed on the edge of the instrument panel.

The left hand door panel section is made larger by this pattern and is accommodated by the greater clearance space to the left of the deployment opening. The hinge axis thereof is also skewed to open more towards the windshield and away from the top front edge of the instrument panel. The greater clearance with the windshield is that location precludes any possibility of impact with the windshield.

Since the righthand end of the quadrangle is skewed towards the rear of the vehicle, and the upper door panel section is given more room with respect to the inside of the windshield thus also preventing contact with the windshield of the upper or forward door section in the quadrangular pattern embodiment of the present invention.

In a second embodiment of the present invention, the deployment opening is closed with three interfit door panel substrate panels together forming a triangle having three unequal sides. The two longer sides converges at one corner of the triangle and extend in a skewed direction with respect to the side-to-side dimension of the instrument panel to also create an asymmetric door pattern.

Each of the door panel substrate panels forms three smaller triangles defined by the sides thereof extending to the center of the triangular deployment door opening. Each of the two longer sides of the deployment opening converge at one peak of the triangle with this end of the triangle extending to the right such that the door panel substrate panels whose hinge sides are defined the long sides of the triangular opening open generally forwardly and rearwardly respectively.

The forward door panel section has its maximum depth located away from the rightmost side thereof to not move into contact with the windshield as the doors are forced open, while the rear door section has only a minimal area overlying atop the upper front edge of the instrument panel to preclude contact with the hand of an occupant.

The base door panel section hinges out to the left into a open area so as to not present a hazard either to the windshield or an occupant.

DETAILED DESCRIPTION

In the following detailed description certain specific terminology will be employed for the sake of clarity and a particular embodiment described in accordance with the requirements of 35 USC 112, but it is to be understood that this not intended to be limiting and indeed should not be so construed inasmuch as the invention is capable of taking many forms and variations within the scope of the appended claims.

Figure 1:
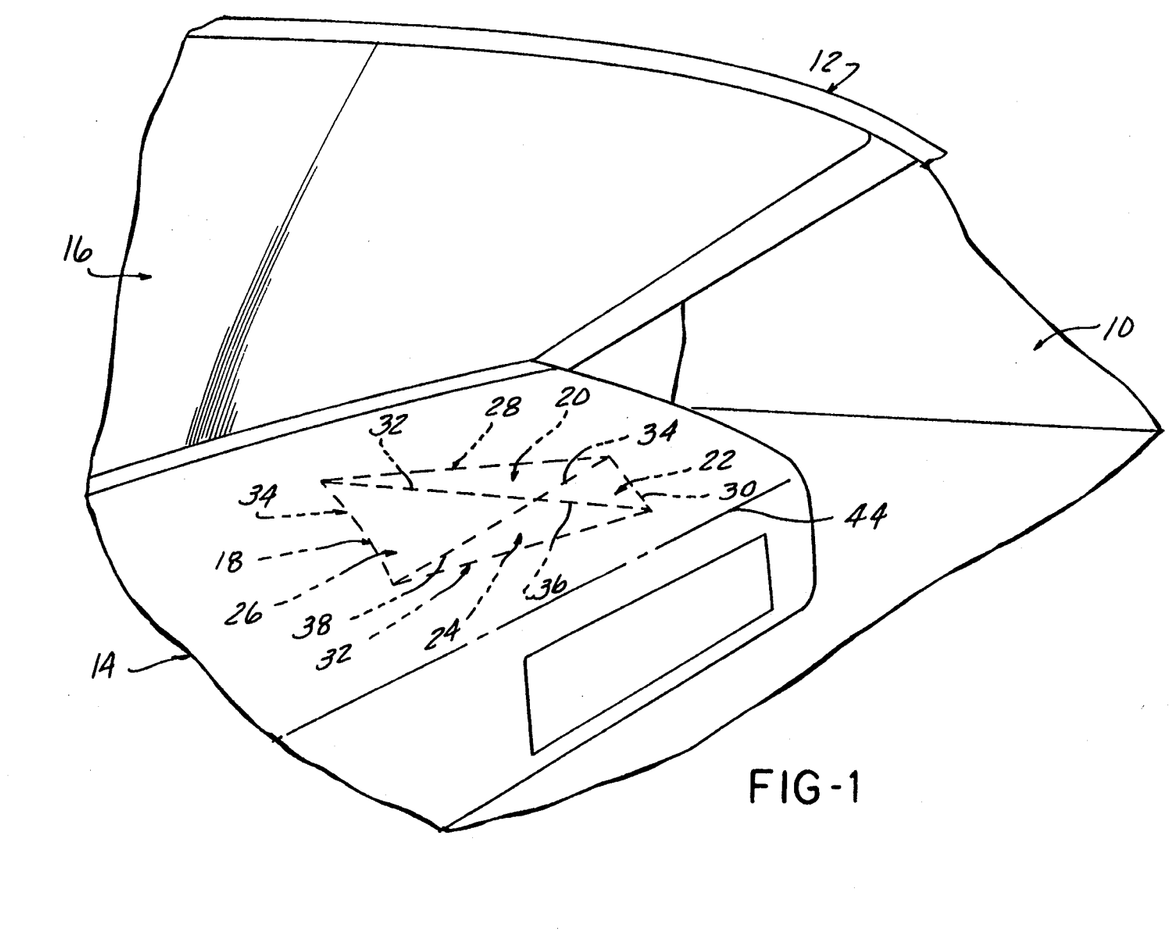
FIG. 1 is a fragmentary perspective view of the interior of the passenger compartment of an automotive vehicle showing a portion of the instrument panel having an air bag deployment opening pattern according to the present invention formed therein.

Referring to FIG. 1, the passenger compartment 10 of an automotive vehicle 12 is shown in fragmentary form with portion of the instrument panel 14 and part of the windshield 16 just forward of the instrument panel 14.

The instrument panel 14 extends transversely to the longitudinal axis of the vehicle, and is located forward of the occupant or passenger side of the front seat with an air bag "top mounted" in the instrument panel portion. The right hand instrument panel portion shown houses the passenger side air bag for the protection of the passenger sitting on the right side of the vehicle driver.

The air bag will be deployed through an opening formed in the top of the instrument panel right-hand portion 14 and rapidly inflated to be disposed forwardly of the passenger to protect the passenger in the event of severe collisions in the manner well known in the art.

The air bag deployment opening, referred to generally with the reference character 18, according to the present invention is preferably of the so-called "invisible seam" design in which the outline of the deployment opening and the doors making up the opening are not visible to the passenger.

The door panel door panel pattern fit into the air bag deployment opening according to the concept of the present invention is skewed and asymmetric in form to thus be incompatible with good interior trim design.

However, the pattern may also be employed with visible door designs.

The particular construction of invisible seam air bag deployment openings is described in U.S. Pat. No. 5,082,310 issued on Jan. 21, 1992, for "Arrangement for Providing an Air Bag Deployment Opening" in which a vinyl skin overlays a foam layer which in turn is supported on a door substrate panel. The vinyl skin is pre-weakened by an cutting of a groove on the inside along a pattern matching the door substrate panel and with door substrate contours concentrating the force exerted by an inflating air bag to cause the vinyl skin to be split along the free edges of each of the deployment door substrate panels which are hinged along one side to the instrument panel substrate at the perimeter of the deployment opening.

The door substrate panels are themselves connected along one side opposite the hinge side by frangible tabs which are fractured at the time of the air bag deployment.

Another approach is described in U.S. Pat. No. 4,991,870 issued on Feb. 12, 1991, for a "Method and Arrangement for Forming and Air Bag Deployment Opening in an Auto Interior Trim Piece", U.S. Pat. No. 5,217,244 issued on Jun. 8, 1993, for an "Arrangement for Forming and Air Bag Deployment Opening" and U.S. Pat. No. 5,080,393 issued on Jan. 14, 1992, for a "Method and Apparatus for Forming an Air Bag Deployment Openings". These later patents describe a so-called linear energy generating element used to cut through the vinyl skin rather than to rely on severing of the outer decorative skin by the force exerted by the door substrate upon inflation of the air bag.

Such constructions are also suitable for use with the present invention.

The air bag deployment opening 18 is normally overlain by a series of door substrate panels 20, 22, 24, 26 interfit together when not opened to close off the deployment opening 18.

According to the concept of the present invention and the embodiment of FIG. 1, each of the door substrate panels 20, 22, 24, 26 are triangular in shape with the base side of each door substrate panel 28, 30, 32, 34 respectively hingedly connected to the adjacent section of the substrate of the instrument panel 14. The remaining two sides of each triangular door substrate panels are free when the seams 32, 34, 36, 38 are broken incidental to opening of the deployment opening allowing each of the door substrate panels to hinge open outwardly towards the interior of the passenger compartment 10. The seams may be constructed according to the above referenced patents as also can be the integral hinge extending along the base sides 28, 30, 32, 34.

Figure 1A:
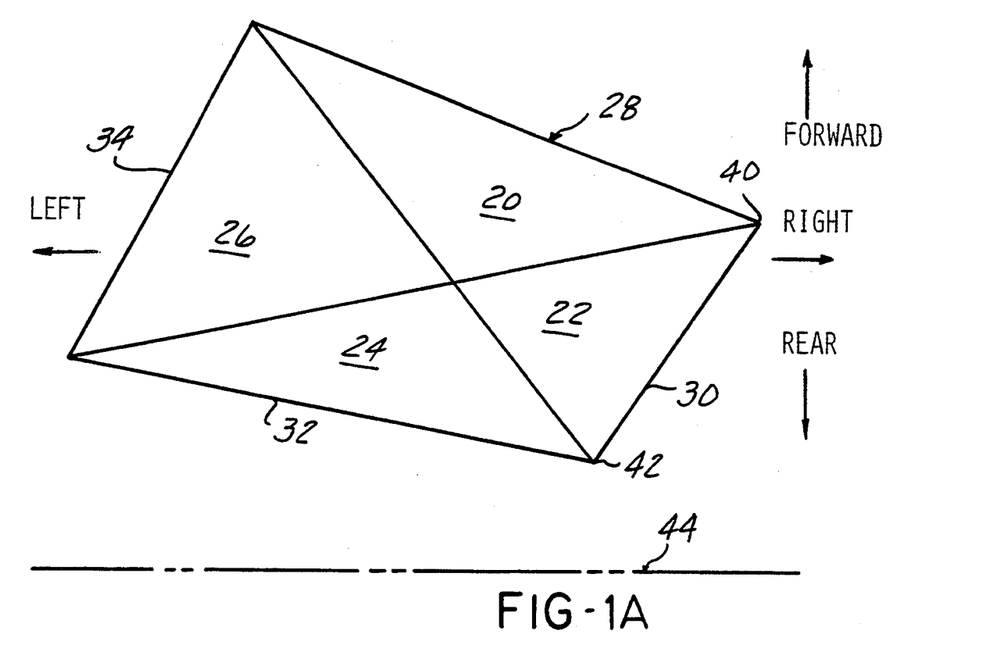
FIG. 1A is diagrammatic representation of the deployment door pattern shown in FIG. 1.

Referring to FIG. 1A, which shows the door pattern in diagrammatic form, it can be seen that the interfit door substrate panels 20, 22, 24, 26 form an unequal quadrangle. The door substrate panel 22 to the right has its hinging base side 30 skewed to the right and with the hinging side 30 substantially shorter than the hinging side 34 of the left door substrate panel 26. This arrangement causes the right most triangular door substrate panel 22 to swing rearwardly when hinged open along the hinging side 30 and also to be of a smaller size, which, taken with its triangular shape having an apex intermediate the corners 40, 42, allows for the door substrate panel 22 to completely avoid the windshield will normally curves around towards the right side of the vehicle.

The left side door substrate panel 26 hinges open to the left, and there is more clearance space with respect to the windshield in this direction. The door substrate panel 26 also swings away from the forward edge 44 of the instrument panel. The triangular door substrate panel 24 has its base or hinging side 32 extending parallel to the front rear edge of the instrument panel 44.

The triangular shape minimizes the overlying area adjacent the edge 44 to reduce the likelihood of contact with an out of position passenger having his or her hand on the edge of the instrument panel.

The forward door substrate panel 20 has a hinge axis side 28 which is inclined rearwardly such as to taken with its triangular shape to obviate the possibility of contact with the windshield.

Figure 2:
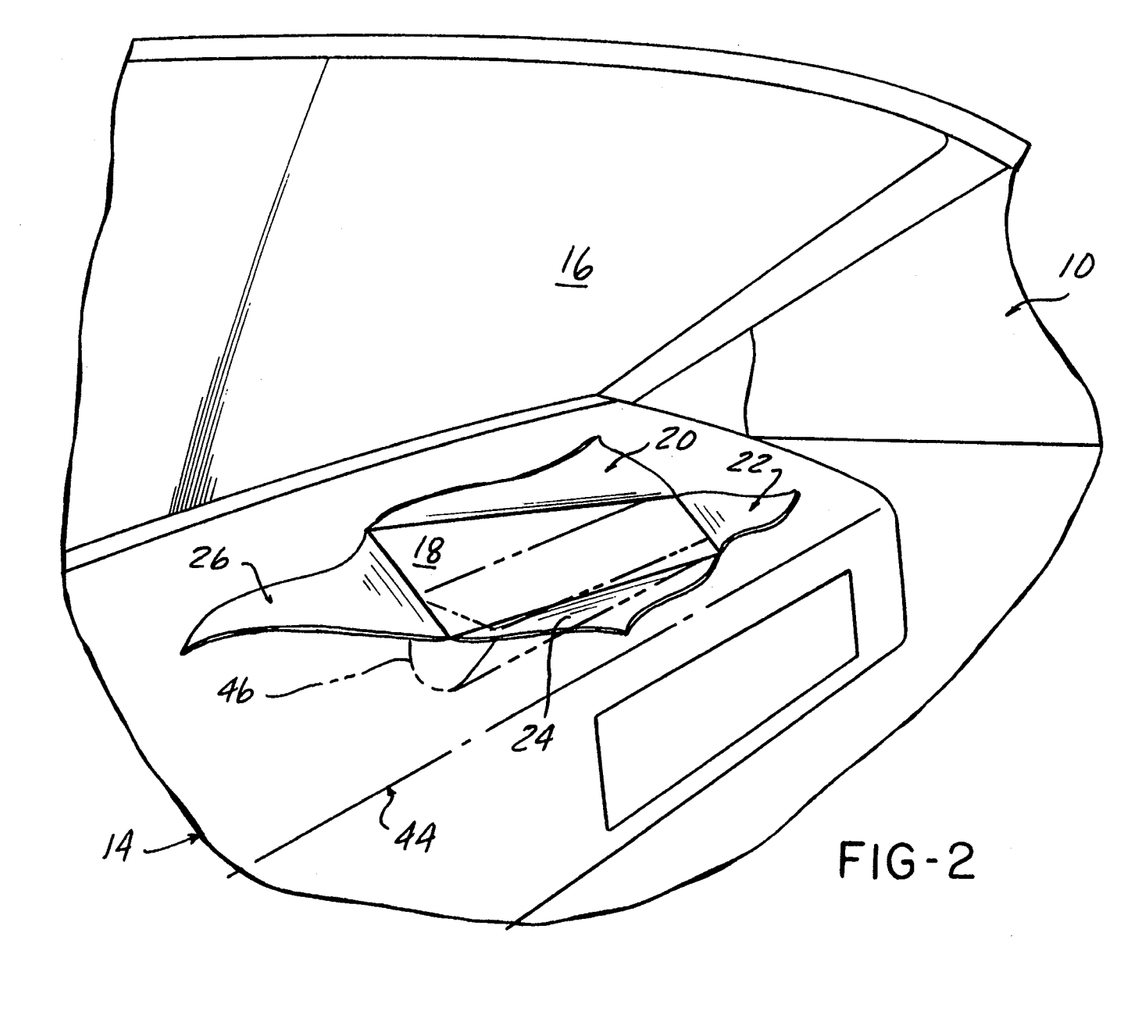
FIG. 2 is a fragmentary perspective view of the interior of the automotive passenger compartment shown in FIG. 1 with the deployment door panel substrate panels in the opened condition.

Referring to FIG. 2, the opening position of the door substrate panels 20, 22, 24, 26 is shown. The relatively small triangular door substrate panels 22 is completely clear of the windshield 16. The rear door substrate panel 24 does not overlap to any significant degree the area along the edge 44 of the instrument panel 14.

The forward triangular door substrate panel 20 also remains clear of the windshield 16.

Accordingly, an air bag inflated from the storage canister 46 may be deployed through the opening 18 with minimal hazard to the passenger.

Figure 2A:
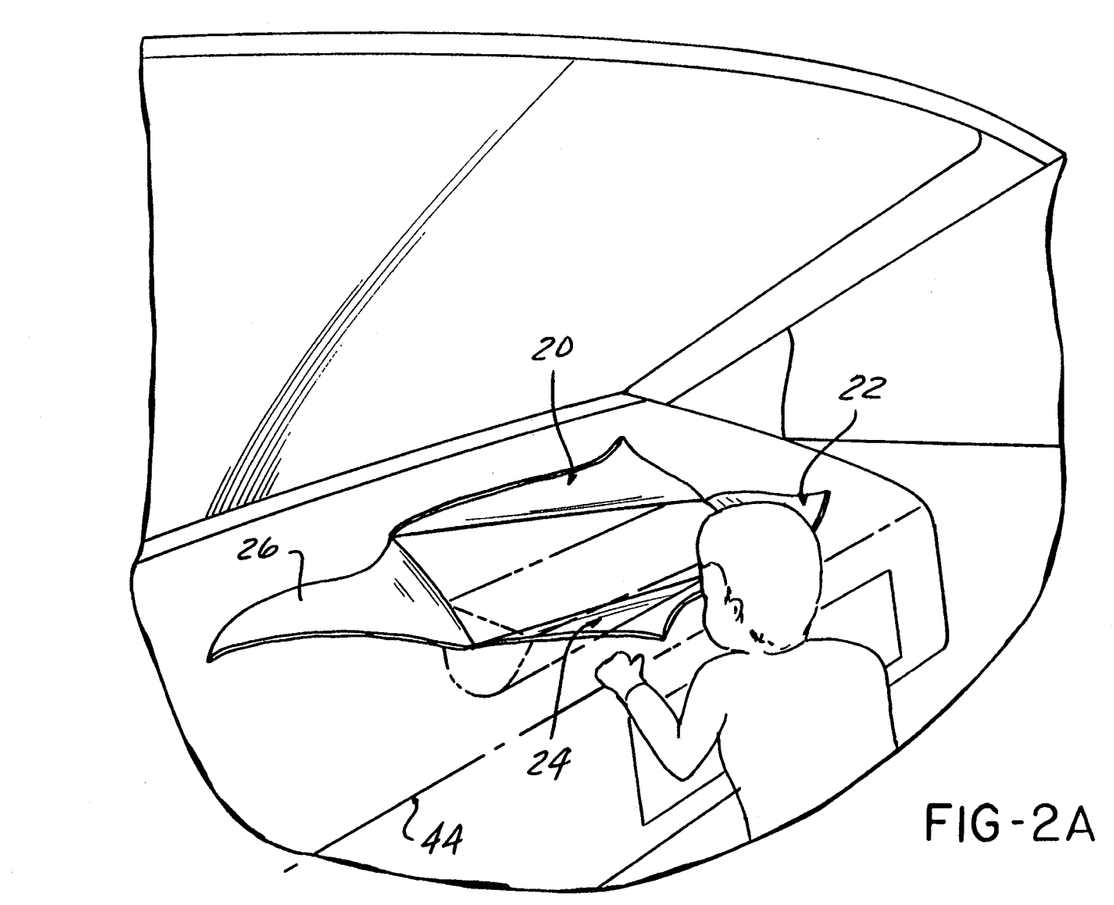
FIG. 2A is a fragmentary perspective view of the passenger compartment shown in FIG. 2 with the deployment door panels opened and showing a child passenger against the instrument panel, to show the reduced hazard to a passenger position by the door pattern of FIG. 2.

FIG. 2A shows an out of position child passenger having his or her hand on the instrument panel rear edge 44, with the rear door substrate panel 20 not coming into contact with the hand or face of the child passenger.

Figure 3:
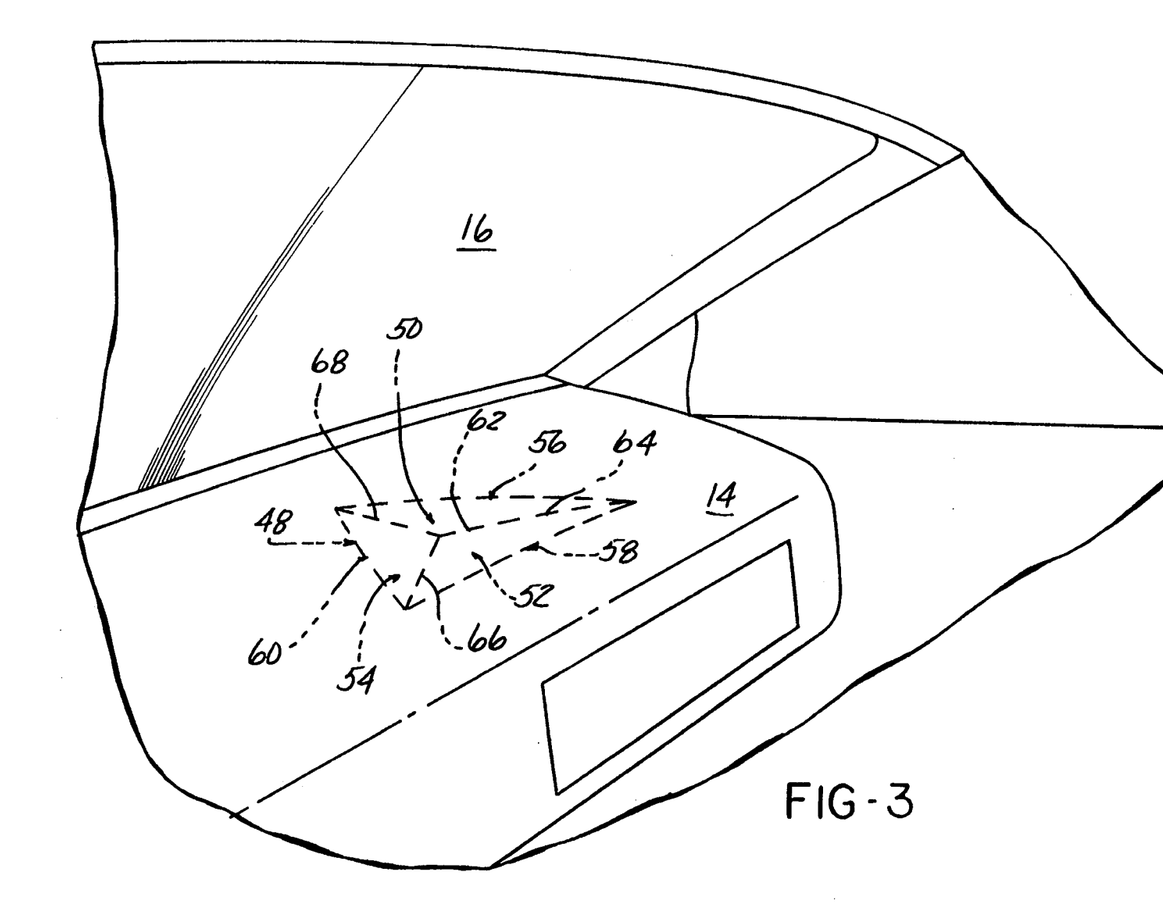
FIG. 3 is a fragmentary perspective view of the interior of the passenger compartment of an automotive vehicle showing a portion of the instrument panel having an air bag deployment opening door pattern according to a second embodiment according to the present invention formed therein.

FIG. 3 shows an alternative door pattern forming a triangular deployment opening 48 which three door substrate panel 50, 52, 54 are interfit together having a base edge 56, 58, 60 respectively which define hinging sides with invisible seams formed by the remaining adjacent sides 62, 64, 66, 68 of the respective door substrate panels 50, 52, 54. The common sides 62, 64, 66, 68 forming seams which are freed at the start of the air bag system activation to allow each of the door substrate panel to hinge open along the hinge base sides 56, 58, 60.

Figure 3A:
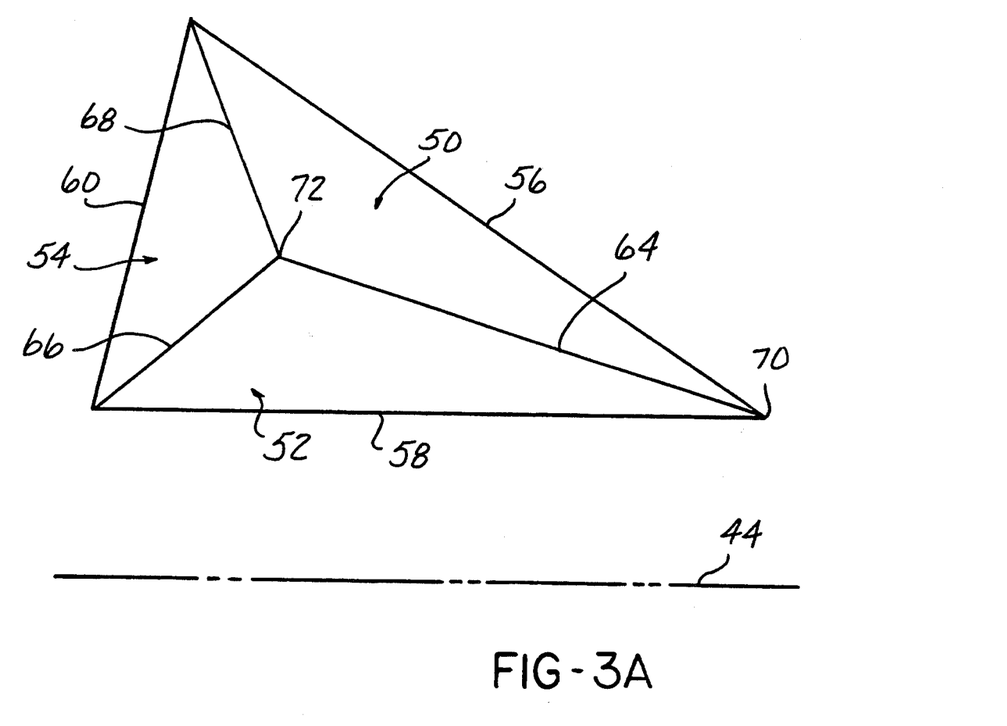
FIG. 3A is a diagram of the deployment door opening pattern shown in FIG. 3.

FIG. 3A shows diagrammatically the door substrate panel 50, 52, 54. The overall deployment opening patterns is triangular in shape and formed by the three triangular door substrate panel 50, 52, 54 interfit together in their closed condition.

The triangular door substrate 50 forms a top right door section, the door substrate panel 52 forms a bottom right door substrate panel and the door section 54 forms a left door section.

The hinged sides 56, 58 of the forward and rear door substrate panel 50, 52 are considerably longer than the hinge side 60 of the left door substrate panel 54 such that the deployment opening forms a relatively tall triangle lying on its side with its apex 70 to the right and with the base of the triangle formed by the hinge side 60 of the left door substrate 54. Thus the greatest depth of the forward and rear door substrate 50, 52 is at their common apex 72 which is located well to the right of the apex 70.

Figure 4:
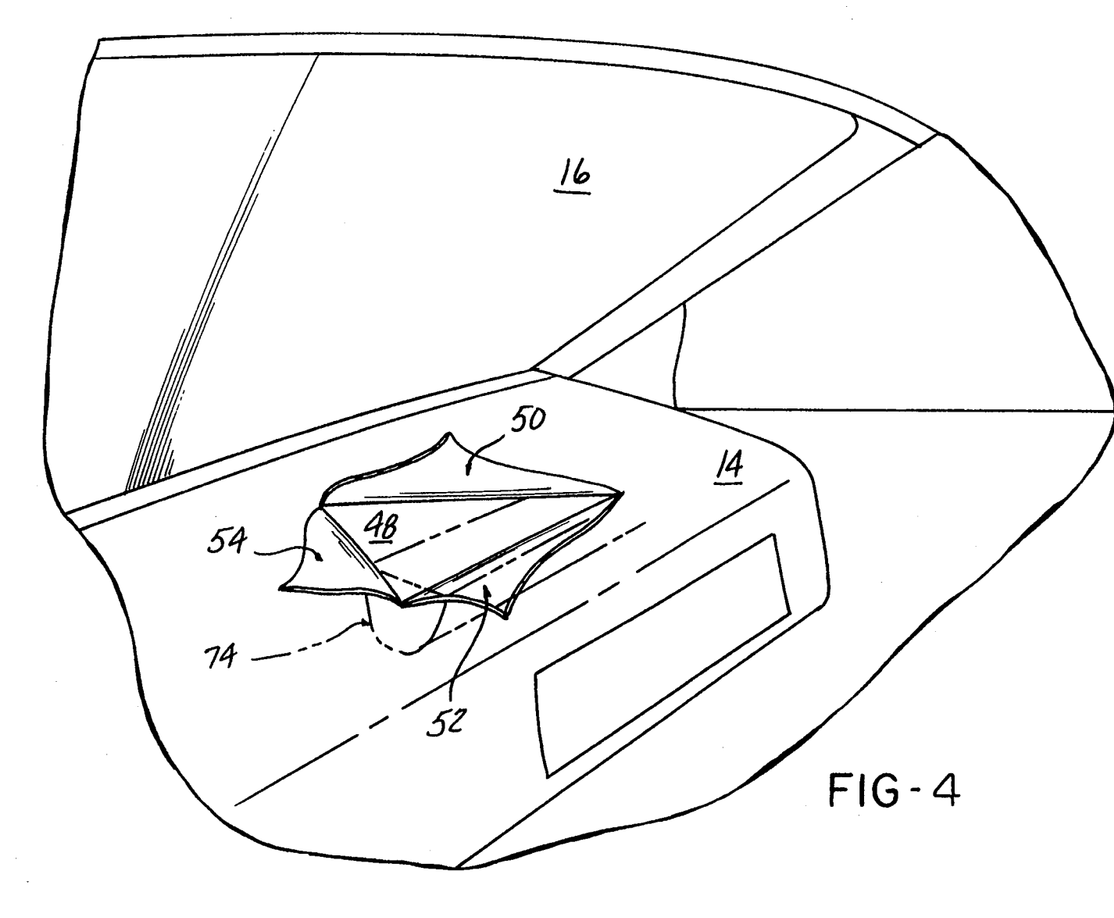
FIG. 4 is a perspective fragmentary view of the interior of a passenger compartment of an automotive vehicle as shown in FIG. 3, with the door substrate panels forming the air bag deployment opening in the open condition.

Accordingly, the edge 58 of the rear door substrate panel 52 extends approximately parallel to the instrument panel edge 44. This arrangement avoids any possibility of contact with the windshield and also minimizes the possibility of contact with an occupant's hands lying atop the instrument panel 44 as can be seen by reference to FIG. 4 showing the top door substrate panel 50, bottom door substrate panel 52, and left door substrate panel 54 in their opened condition forming the triangular deployment opening 48 through which the air bag will have deployed from the storage canister 74 indicated in phantom, avoiding windshield 16.

Figure 4A:
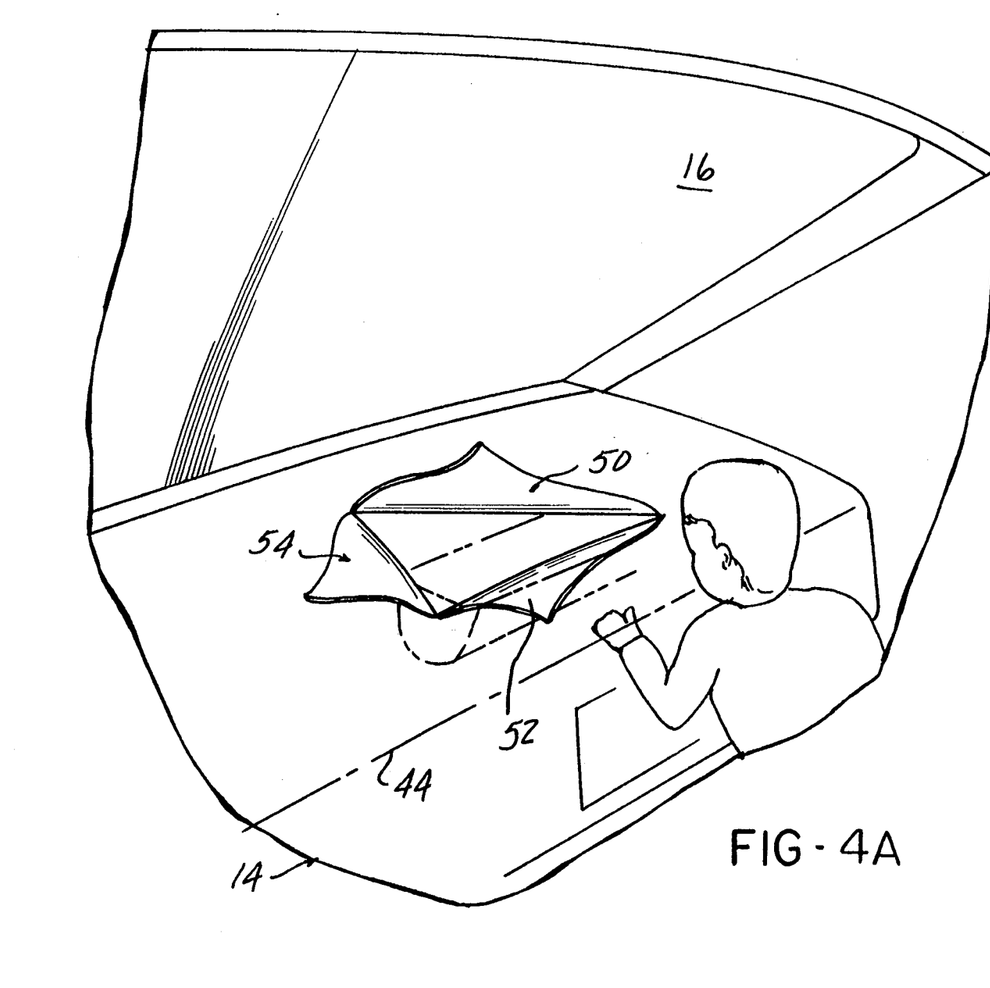
FIG. 4A is a fragmentary perspective view of the passenger compartment of an automotive vehicles as shown in FIG. 4 with the deployment doors open with a child passenger in position against the instrument panel to illustrate the reduced hazard to a passenger by the door pattern of FIG. 3.

FIG. 4A shows how the rear door substrate panel 52 has minimal area close to the edge 44 of the instrument panel 14. Thus minimize the hazard to a passenger such as the child shown having a hand on the instrument panel 14. It should be noted that variations of these particular patterns shown will still yield the result described, i.e., in the quadranglarly shaped pattern, the door substrate panel need not meet at a single point, i.e., the left and right door panel substrate panels could comprise slightly truncated triangles forming a common seam line extending generally front to rear.

The X pattern form may also take a form wherein the upper and lower V forming the X can have different angles of diversion without affecting the benefits realized by the invention.

I claim:

1. An air bag deployment door construction for passenger carrying vehicle having a passenger compartment defined by trim structure equipped with an air bag safety system including an air bag receptacle stowed behind an interior trim structure, with a deployment opening formed in said interior trim structure upon activation of said air bag system;

said air bag deployment construction formed by a plurality of generally triangular door substrate panels each hinged along one side of said triangular shape to said trim structure, said door substrate panels interfit together with the remaining sides of each of said triangular door substrate panels contiguous with next adjacent door substrate panels to close off said deployment opening when said door substrate panels are hinged to a closed position, said generally triangular door substrate panels not all of the same size and arranged in an asymmetrical pattern.

2. The air bag deployment door construction according to claim 1 wherein said passenger compartment has an instrument panel located at a forward side of said passenger compartment extending transversely to the longitudinal axis of said vehicle, said instrument panel comprising said interior trim structure formed with said deployment opening.

3. The air bag deployment door construction according to claim 2 wherein four of said vehicle said door substrate panels are included, forming a quadrangle when in said closed position.

4. The air bag deployment door construction according to claim 2 wherein three of said door substrate panels are included, forming a triangle when in said closed position.

5. The air bag deployment door construction according to claim 3 wherein said four door substrate panels interfit to form a quadrangle when in said closed condition, and are arranged so that said quadrangle extends generally along said instrument panel.

6. The air bag deployment door construction according to claim 5 wherein right and left triangular door substrate panels each have a hinging side of said triangular shape which define either side of said quadrangle, said left door section substantially larger than said right door section.

7. The air bag deployment door construction according to claim 6 wherein a forward and rear triangular door substrate panels are positioned between the hinging sides of said right and left triangular door substrate panels, said hinging side of said rear door section skewed with respect to said instrument panel by having the left end thereof forward of the right end.

8. The air bag deployment door construction according to claim 6 wherein the base hinging side of said right door section is skewed by having the forward end thereof to the left of said rear end thereof.

9. The air bag deployment door construction according to claim 4 wherein an apex of said triangular deployment opening is on the right side of said instrument panel, with a base side of said triangle extending generally in the direction of the longitudinal axis of said vehicle to open to the left, said door substrate panels each having a vertex meeting the vertex of the other door substrate panels.

10. The air bag deployment door construction according to claim 9 wherein said two other triangular door substrate panels have their hinging sides extending along said instrument panel to open forwardly and rearwardly respectively.

11. The air bag deployment door construction according to claim 2 wherein said deployment opening and door substrate panels are overlain with a smooth covering layer to be invisible from within said passenger compartment.

* * * * *

UNITED STATES PATENT AND TRADEMARK OFFICE
CERTIFICATE OF CORRECTION

PATENT NO. : 5,342,088
DATED : August 30, 1994
INVENTOR(S) : David J. Bauer

It is certified that error appears in the above-indentified patent and that said Letters Patent is hereby corrected as shown below:

Title page, item [57] in the abstract, line 7 delete "forming and insert --form--.

Column 2, line 14, delete "door flap".
Column 2, line 42, delete "is" and insert --at--.
Column 2, line 45, delete "and".
Column 2, line 65, after "the" insert --two--.
Column 2, lines 66-67, after "defined" insert --by--.
Column 2, line 67, after "the" (first occurrence) insert --two--
Column 4, line 15, delete "door panel" (first occurrence).
Column 4, line 65, delete "32, 34" and insert -132, 134--.
Column 5, line 16, after "windshield" insert --.--.
Column 5, line 17, delete "will" and insert --It is noted that the windshield--.
Column 5, line 25, delete "front rear" and insert --forward--.
Column 5, line 25, after "edge" insert --44--.
Column 5, line 25, delete "44" and insert --14--.
Column 5, line 47, delete "20" and insert --24--.
Column 5, line 51, after "48" insert --in--.

UNITED STATES PATENT AND TRADEMARK OFFICE
CERTIFICATE OF CORRECTION

PATENT NO. : 5,342,088
DATED : August 30, 1994
INVENTOR(S) : David J. Bauer

It is certified that error appears in the above-indentified patent and that said Letters Patent is hereby corrected as shown below:

Column 6, line 46 (Claim 1), after "deployment" insert --door--.
Column 6, line 66 (Claim 3), delete "said vehicle".
Column 8, line 8 (Claim 9), delete "of said triangle".
Column 8, lines 9-10 (Claim 9), after "vehicle" insert --,one triangular substrate hinged on said base side to be able --.

Signed and Sealed this

Twenty-fifth Day of July, 1995

*Attest:*

BRUCE LEHMAN

*Attesting Officer*    *Commissioner of Patents and Trademarks*